United States Patent Office 2,879,236
Patented Mar. 24, 1959

2,879,236

METHOD OF PREPARING STARCH AND UREA-FORMALDEHYDE ADHESIVE AND PRODUCT OBTAINED

Albert P. Yundt, Southampton County, and Keith E. Bradway, Franklin, Va., assignors to Union Bag-Camp Paper Corporation, a corporation of Virginia No Drawing. Application June 7, 1956
Serial No. 589,884

4 Claims. (Cl. 260—17.3)

It is an object of this invention to provide a size or adhesive, free from tendencies toward retrogradation, and which is only slowly subject to gelation and increase of viscosity on aging.

It is a further object of this invention to provide a size or adhesive as aforesaid which can be used at reasonably low viscosity and which will cure to an insoluble condition.

It is a further object of this invention to provide a size or adhesive as aforesaid based on a modified starch having a degree of combination with urea-formaldehyde compounds greater than heretofore possible.

It is a further object of this invention to provide a method for producing a size or adhesive as aforesaid at minimum cost.

Starch, one of the polysaccharides, is one of the cheapest of the colorless adhesives, sizes and finishing agents available to paper, textile and comparable industries. Its value in these industries arises chiefly from its adhesive properties. Its uses as library paste and simple laundry starch are familiar to all and represent minimal demands on its various properties. For most purposes, starch is chemically modified to decrease its solution viscosity and to prevent retrogradation, gelation and changes in viscosity on aging.

In order to avoid alternative phraseology, the term "adhesive" in its noun sense, is used herein to designate a product regardless of whether its use be as a laminating agent or as a binding agent for a pigment coating material or as a stiffening or sizing material for textiles or other fibrous webs.

Many purposes today require that a starch base adhesive shall be soluble for purposes of application but, once dried, shall become substantially insoluble and resistant to softening on re-wetting. The most widely used insolubilizing agent is an aqueous solution of urea-formaldehyde resin which is simply mixed with a starch solution. This simplicity is not attainable however, in the case of a starch chemically modified in a way that substantially reduces its degree of polymerization. Where such modified starches are involved, present practice for the most part consists of cooking a pre-formed resin or resin monomer, e.g.: dimethylol urea, with the starch at approximately pH 5.0. The formation of dimethylol urea requires a 2 to 1 molal ratio of formaldehyde to urea which is also ideal for complete resin formation, hence there is considerable preferential reaction between dimethylol urea or resin molecules to form high molecular weight urea-formaldehyde polymers rather than forming chemical combinations with the starch molecules.

A mole of urea can react with up to 4 moles of formaldehyde to yield a variety of methylol ureas as follows:

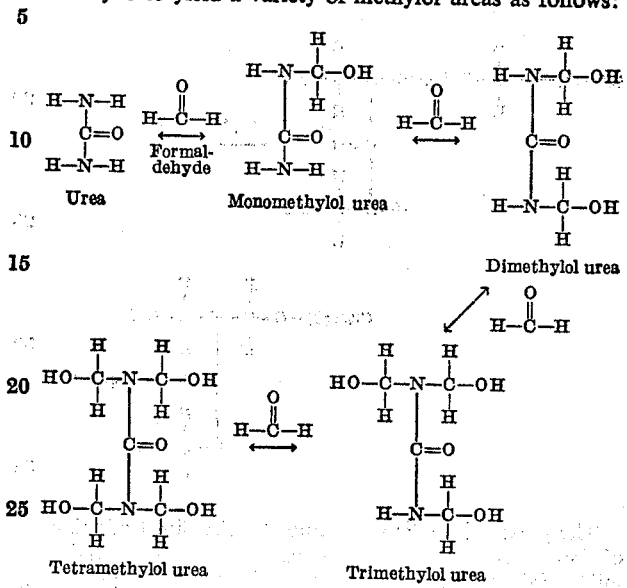

All of the above reactions are reversible and, at equilibrium, a large excess of formaldehyde is required to produce any of the tetramethylol urea. A solution containing a 5 to 1 ratio of formaldehyde to urea equilibrates with 2 parts of uncombined formaldehyde, the remaining combined formaldehyde being a mixture of mono-, di-, tri-, and tetramethylol urea.

The object is to obtain maximum combination of urea-formaldehyde molecules with starch molecules, with minimum polymerization of the urea-formaldehyde molecules, since such polymerization is detrimental to the result desired.

Polymerization results under the influence of acid catalysts whereby water is split off between a methylol group and an amide hydrogen. Dimethylol urea presents the greatest opportunity for polymerization, since its methylol groups and amide hydrogens are present in equal numbers and the possibilities for combination are at a maximum. Trimethylol urea is less likely to polymerize of itself than dimethylol urea, while tetramethylol urea in all probability will not polymerize at all since there are no amide hydrogens left. Combination with starch, however, is readily possible. The trimethylol and tetramethylol ureas can exist only in the presence of the above noted excess of formaldehyde.

Starch can become combined with the urea-formaldehyde resin molecules by two routes:

(1) A hydroxyl group of the starch can combine with the hydroxyl of a methylol group on the resin and split out water or (2) A hydroxyl group of the starch can combine with free formaldehyde to form a methylol group attached to the starch by an oxygen, and then the hydroxyl part of this methylol group can combine with an amide hydrogen of the resin and split out water. Typical examples using dimethylol urea to represent the resin are:

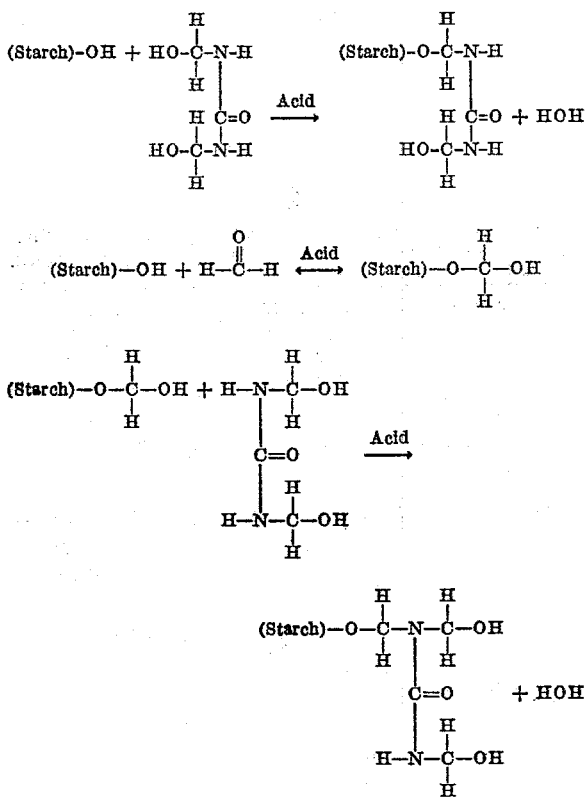

The present invention contemplates the direct addition of formaldehyde and urea to the starch solution under mild acidic condition and with the formaldehyde greatly in excess of the urea in molal ratio. After cooking the starch-formaldehyde-urea mixture, sufficient urea is added to bring the formaldehyde to urea molal ratio to approximately 2.0. When cooled, a relatively stable, fluid starch solution is obtained, which can be cured to an insoluble starch film. If long pot life is desired, the solution can be neutralized or be made slightly alkaline.

The proper reaction time is a function of concentrations, temperature and pH. During cooking, viscosity falls greatly as a result of the addition of bulking side groups. As the cooking is prolonged, the viscosity begins to rise as a result of cross-linking of starch chains. This latter reaction affords an indication of when the optimum cooking effect has been obtained. The reaction should be inhibited by change of pH or temperature before the viscosity rise becomes great. If the intended end use renders a higher terminal viscosity permissible, it is better to start with a less degraded starch. Excessive reaction gives rise to a phlegm-like material and then a gel.

One example of the preparation of a high solids formulation of a starch binder for clay coating for paper is as follows.

Into a ribbon mixer was charged:

| | |
|---|---|
| Acid hydrolized 90 fluidity starch | pounds 500 |
| 37% formaldehyde | gallons 45 |
| Urea | pounds 106 |
| Water | gallons 77 |

This was adjusted to pH 6.0 with acetic acid and cooked to 195° F. with direct steam and held 30 minutes. Then to this starch-resin solution was added:

| | |
|---|---|
| Urea | pounds 60 |
| Calgon solution (20%) | gallons 6 |

The starch-resin solution was added with mixing to a pugged clay slip containing:

| | Pounds |
|---|---|
| Huber Hydrosperse Clay | 3300 |
| Water | 1070 |

A 63% solids coating color was obtained having viscosities, at 105° F., measured with a number 5 spindle on a Brookfield viscometer of 7600 centipoises at 10 r.p.m. and 1900 centipoises at 100 r.p.m. This color was catalyzed with 12 pounds of ammonium polyphosphate dissolved in water to give a 61% solids coating of slightly higher viscosity. A coating of the preparation on bleached board had fair wet rub properties when wound at the end of the machine and excellent wet rub after storing in the roll for two weeks. Substantially identical results were obtained by using 23 gallons of U.F. Concentrate 85 to replace all the formaldehyde and 66 pounds of the urea. The water volume was adjusted to obtain the same concentrations. U.F. Concentrate 85 is a commercially available more convenient source of concentrated formaldehyde and urea in approximately 4.6:1 molal ratio. On receipt, it is virtually an equilibrium mixture of free formaldehyde and methylol ureas.

A wash-resistant starch size for textile application was prepared in the laboratory as follows:

| | Grams |
|---|---|
| 80 fluidity acid hydrolyzed starch | 10 |
| Formaldehyde solution (37%) | 1.6 |
| Urea | 0.25 |
| Water | 100 |

This was adjusted to pH 5.5 and cooked on the steam bath at 195° F. for 30 minutes. Then 0.2 gram urea was added and the solution was allowed to cool to room temperature. Ammonium chloride, 0.1 gram, was added as a catalyst and the solution was used to treat an unsized muslin. The cloth was dried one hour at 220° F. The size was retained after repeated washing.

Caution must be exercised in the use of the above formulas because minor differences in the degree of degradation of the starch can make a significant difference in the ease of its insolubilization. Although fluidity is the standard method of the starch industry for expressing degree of degradation, there is no universal agreement on the details of its measurement. Accordingly, starches rated at a given fluidity will still vary in degree of degradation from supplier to supplier. One 90 fluidity starch tested with the first formula resulted in incipient gelling.

Water resistant starches prepared as above set forth, may not meet perfectly all of the problems which any such starch may be called upon to meet. In most end uses, however, these starches will produce results varying from a minimum of satisfactory to a maximum of outstanding.

We claim:
1. A method of preparing in low viscosity starch adhesive adapted to be insolubilized in the presence of acid and heating at elevated temperatures to a water-resistant condition comprising, introducing a water solution of urea-formaldehyde resin having a pH of about 5.0 and containing about 5 moles of formaldehyde per mole of urea into a water solution of acid hydrolyzed starch, adjusting the pH of the mixture to pH of 4-7, cooking the resulting acid aqueous mixture of urea-formaldehyde resin solution and starch solution at a temperature of between about 180° F. to about 206° F. for a period of time sufficient to effect a drop in the viscosity of said mixture to a minimum and before the viscosity rises, terminating said cooking, adding an amount of urea to said cooked solution to adjust the total formaldehyde to urea molal ratio to about 2, thereby obtaining a low viscosity adhesive capable of insolubilization in acid condition by heating.

2. A method as claimed in claim 1 wherein the pH of said mixture of urea-formaldehyde water solution and starch water solution is adjusted to a pH of about 5.5 prior to cooking said mixture.

3. A method as claimed in claim 1 wherein said mixture of urea-formaldehyde water solution and starch water solution is cooked for a period of about one-half hour at a temperature of about 195° F.

4. A starch adhesive prepared in accordance with the method defined in claim 1.

References Cited in the file of this patent

UNITED STATES PATENTS 2,487,036     Wise ------------------ Nov. 1, 1949